United States Patent [19]

Piasecki

[11] Patent Number: 4,905,932
[45] Date of Patent: Mar. 6, 1990

[54] ROTARY WING AIRCRAFT SHROUDED PROPELLER TAIL ASSEMBLY

[75] Inventor: Frank N. Piasecki, Haverford, Pa.

[73] Assignee: Piasecki Aircraft Corporation, Essington, Pa.

[21] Appl. No.: 209,576

[22] Filed: Jun. 21, 1988

[51] Int. Cl.[4] .............................................. B64C 27/82
[52] U.S. Cl. .................................... 244/17.19; 244/52
[58] Field of Search ................. 244/17.19, 17.21, 12.5, 244/23 D, 52, 53 B

[56] References Cited

U.S. PATENT DOCUMENTS

| | | | |
|---|---|---|---|
| 2,518,697 | 8/1950 | Lee | 244/17.19 |
| 3,015,460 | 1/1962 | Christenson | 244/17.19 |
| 3,138,349 | 6/1964 | Piasecki | 244/17.21 |
| 3,222,012 | 12/1965 | Piasecki | 244/17.21 |
| 3,241,791 | 3/1966 | Piasecki | 244/17.19 |
| 3,260,482 | 7/1966 | Stroukoff | 244/17.19 |
| 3,750,689 | 8/1973 | Britt | 244/53 B |

Primary Examiner—Joseph F. Peters, Jr.
Assistant Examiner—Rodney Corl
Attorney, Agent, or Firm—Willard M. Hanger

[57] ABSTRACT

An improved structure for the shrouded propeller tail duct or "ring tail" of a rotary wing aircraft providing rotor torque counteracting and aircraft yaw control forces in all flight conditions of hovering and high speed cruising flight. The rear portion of one lateral side of the shrouded propeller duct comprises a plurality of overlying arcuate segments that are pivotally supported for rotation relative to each other about a vertical axis between a retracted position for high speed flight in which the segments are in a mutually overlying position constituting one side of the duct and an extended position in which the segments are in a mutually adjoining relationship with their edges only overlapping and extending obliquely transversely of the duct interior in the form of a continuous, rearwardly projecting and transversely extending arcuate extension of the interior wall of one side of the duct. This extendable elbow duct section, in combination with a vertically extending rudder vane comprising a plurality of tandemly arranged sections with pivotal connections of each other for rotation relative to one another about respective axis between a neutral position with the vane sections in alignment and a deflected position with the vane sections angularly arranged relative to each other in the form of an arc extending transversely of the duct forwardly of and congruent with the contour of the fully extended duct segments, provides a propeller slip stream containing and deflecting structure that smoothly deflects the slip stream from the propeller through 90 degrees with minimum turbulence when the aircraft is in a slow speed and hover flight condition.

20 Claims, 6 Drawing Sheets

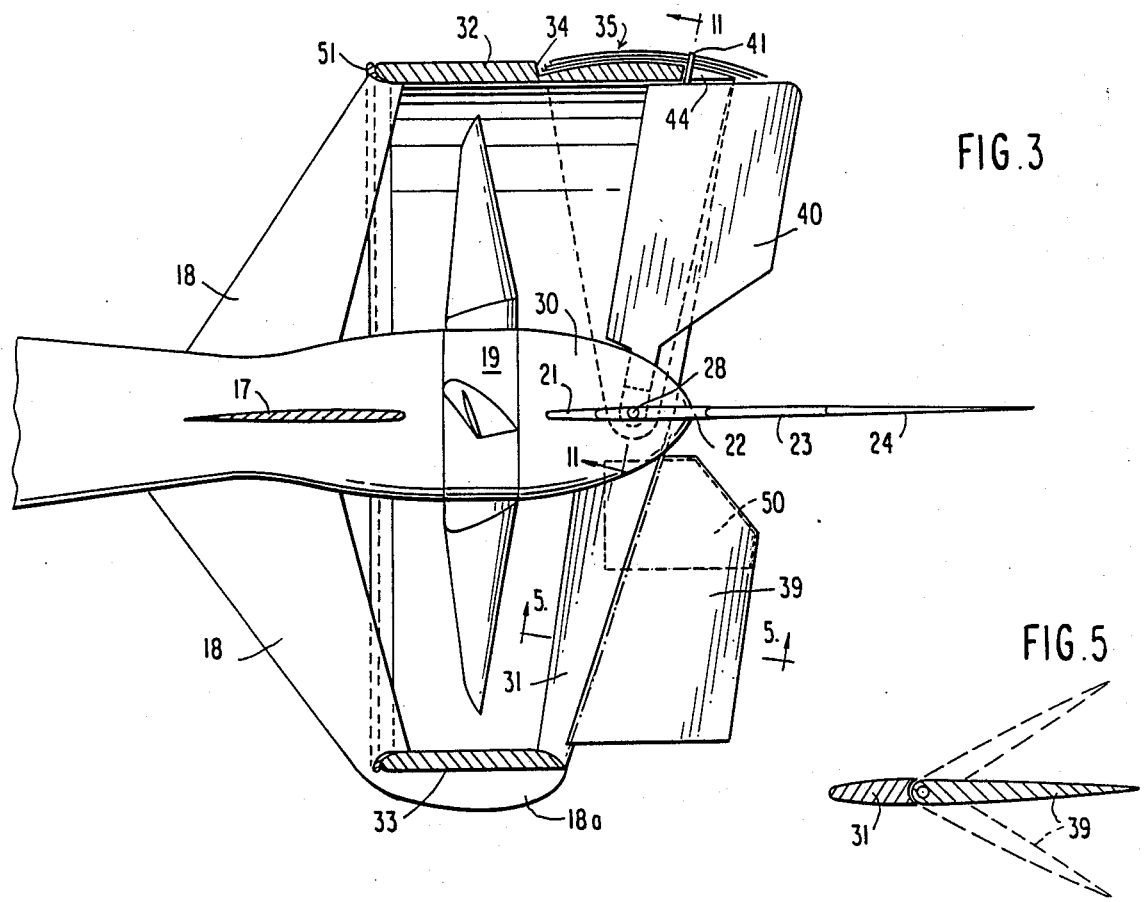
FIG. 3
FIG. 5
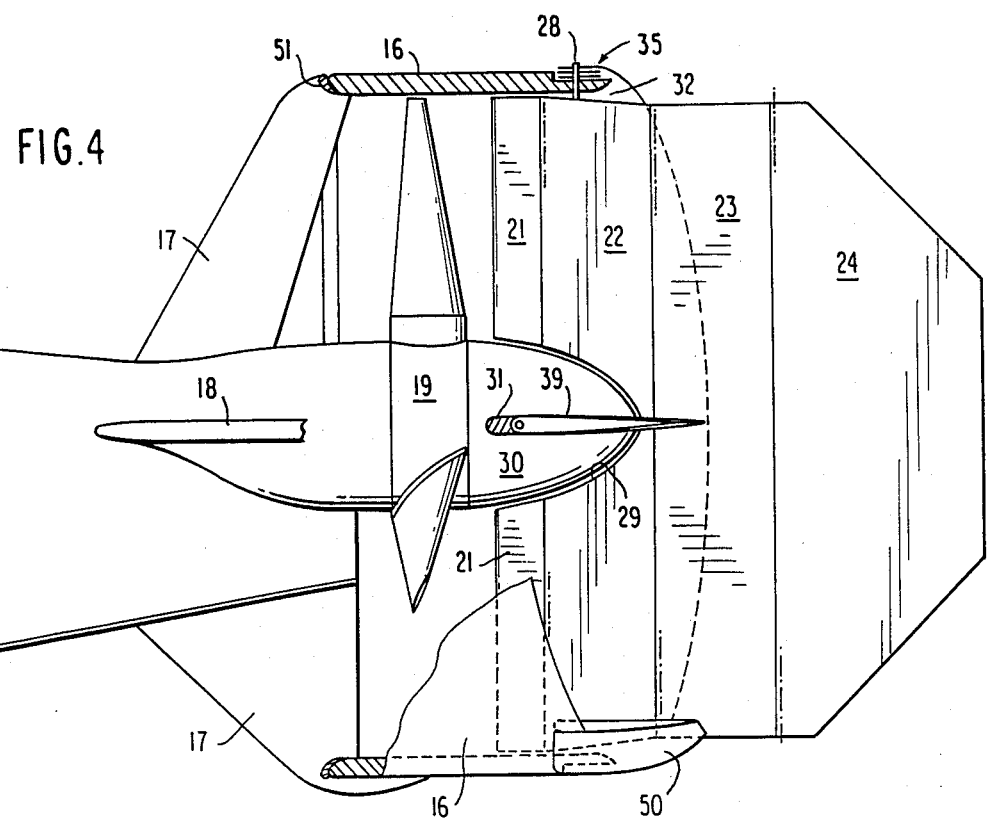
FIG. 4

ROTARY WING AIRCRAFT SHROUDED PROPELLER TAIL ASSEMBLY

"The U.S. Government has a paid-up license in this invention and the right in limited circumstances to require the patent owner to license others on reasonable terms as provided by the terms of contract No. DAAJ02-C-0008 awarded by the U.S. Army."

BACKGROUND OF THE INVENTION

This invention relates to an improved shrouded propeller tail duct or a "ring tail" assembly for a rotary wing aircraft, particularly a single rotor compound helicopter in which a fixed wing provides lift for high speed forward flight with the rotor unloaded. The shrouded duct within which a rotating propeller is contained provides azimuth and attitude control for the aircraft and controls the direction in which the slip-stream from the propeller exits from the shrouded tail duct establishing a transversely directed thrust that counteracts the torque generated by the main lifting rotor and provides aircraft yaw control. The assignee of this application owns a number of patents disclosing various configurations of the "ring tail" or shrouded propeller duct structure in which various configurations of the duct containing the propeller and movable or fixed surfaces control the direction and deflection of the slip stream from the tail propeller. Typical "ring tail" structures developed by the assignee are disclosed in U.S. Pat. Nos. 3,138,349; 3,222,012; 3,241,791 and 3,260,482. All of these disclosures deal with a tail structure having an annular duct containing a forwardly facing propeller which provides thrust for both propelling the aircraft in forward flight and rotor anti-torque and yaw control forces for the aircraft in a slow speed or hovering mode. In general all of these prior art documents disclose various configurations of one or more vertically extending rudder assemblies having a large surface area mounted for pivotal motion about a vertical axis within an annular duct rearwardly of the propeller in which the degree of angular deflection of the rudder surface or surfaces transversely of the duct longitudinal axis and or provisions for modifying the camber of the rudder surface when deflected, control the direction of the propeller slip stream exiting from the rear of the duct to provide both lateral anti torque forces and azimuth directional control forces for the aircraft in all flight conditions.

U.S. Pat. No. 3,260,482, incorporated herein by reference, discloses a "ring tail" structure in which a plurality of vertically extending, multiple section vane assemblies are mounted for pivotal motion about a vertical axis in the duct behind the propeller. The degree of pivotal rotation of each of the vane assemblies between a neutral position in alignment with the axis of the duct and a deflected position extending transversely of the duct axis controls the amount the propeller slip stream is deflected in exiting from the duct to create the transversely directed thrust necessary for counteracting rotor torque and controlling the azimuth direction of the aircraft. This patent also discloses a segment of the inner duct surface on one side of the duct wall supported by a bell crank linkage for bodily movement between a retracted position within a recess in the duct interior surface and an extended position spaced inwardly from the duct wall to protrude angularly transversely across the interior of the duct forwardly of the duct trailing edge in the path of the propeller slip stream.

SUMMARY OF INVENTION

This invention is an improvement of prior "ring tail" configurations which provides increased propulsive, anti-torque, longitudinal and yaw control efficiency, together with a lower drag in cruise flight at a lower installed weight. A primary aspect of the improved design involves one lateral side of the shrouded duct being configured such that a rearmost portion of the wall comprises a plurality of overlying arcuate segments that are supported at their upper and lower ends for respective pivotal rotation about a common vertical axis establishing sliding motion relative to one another in the longitudinal direction of the duct axis between a retracted position and an extended position establishing a transversely projecting rear duct extension. In the retracted position during forward high speed of the aircraft the segments of a preferred embodiment overlie one another in a mutually overlying, nesting relationship to form the outer wall portion of the rear portion of one lateral side of the shrouded duct. For low speed and hover flight conditions the duct segments are each pivoted about a vertical axis so as to slide rearwardly over one other to the extended position in which the segments adjoin one another with their edges only overlapping such that the segments extend as a unit curving obliquely transversely of the duct longitudinal axis to form a continuous, rearwardly extending extension of one lateral side of the interior wall of the duct within which the propeller slip stream is smoothly deflected substantially perpendicular to the duct and aircraft longitudinal axes. This feature, combined with a tandemly arranged, pivotally connected multiple section single rudder surface which is an improved variation of previously utilized laterally spaced multiple rudder sections comprising a rudder assembly pivotally mounted within the duct interior of the nature disclosed in several of the previously listed "ring tail" patents, provides greatly increased efficiency in controlling the direction and transverse thrust provided by the slip stream from the ducted propeller. In particular the invention of this application provides a considerable increase in thrust efficiency of a deflected ducted propeller slip stream as compared to the configuration of U.S. Pat. No. 3,260,482 in that the disclosed invention reduces the drag and interference created by multiple side by side rudder vanes and eliminates turbulence in the interior of the shrouded duct created by the inwardly protruding vane 60 of the noted patent. This invention provides a smoothly contoured extendable duct exit channel through which the propeller slip stream is smoothly deflected with minimum turbulence through substantially 90 degrees when the aircraft is in a hovering mode.

An object of this invention is to provide an improved shrouded duct configuration for a "ring tail" rotary wing aircraft which increases the efficiency and effectiveness in controlling the deflection of a shrouded propeller slip stream.

A further object of this invention is to provide a retractable, transversely extending extension on one side of a shrouded duct of a "ring tail" rotary wing aircraft.

Another object of the invention is to provide an improved version of vertically oriented propeller slip stream deflecting surfaces rotatable within an extendable duct housing of a shrouded duct "ring tail" rotary wing aircraft.

Yet another object is to provide improved longitudinal and azimuth directional control of a rotary wing compound aircraft in all flight conditions.

BRIEF DESCRIPTION OF THE DRAWINGS

FIG. 3 is a horizontal cross section along section line 3—3 of FIG. 2.

FIG. 4 is a vertical cross section along section line 4—4 of FIG. 2.

FIG. 5 is a vertical cross section of an aircraft elevator surface along section line 5—5 of FIG. 3.

DETAILED DESCRIPTION OF THE INVENTION

Figure 1:
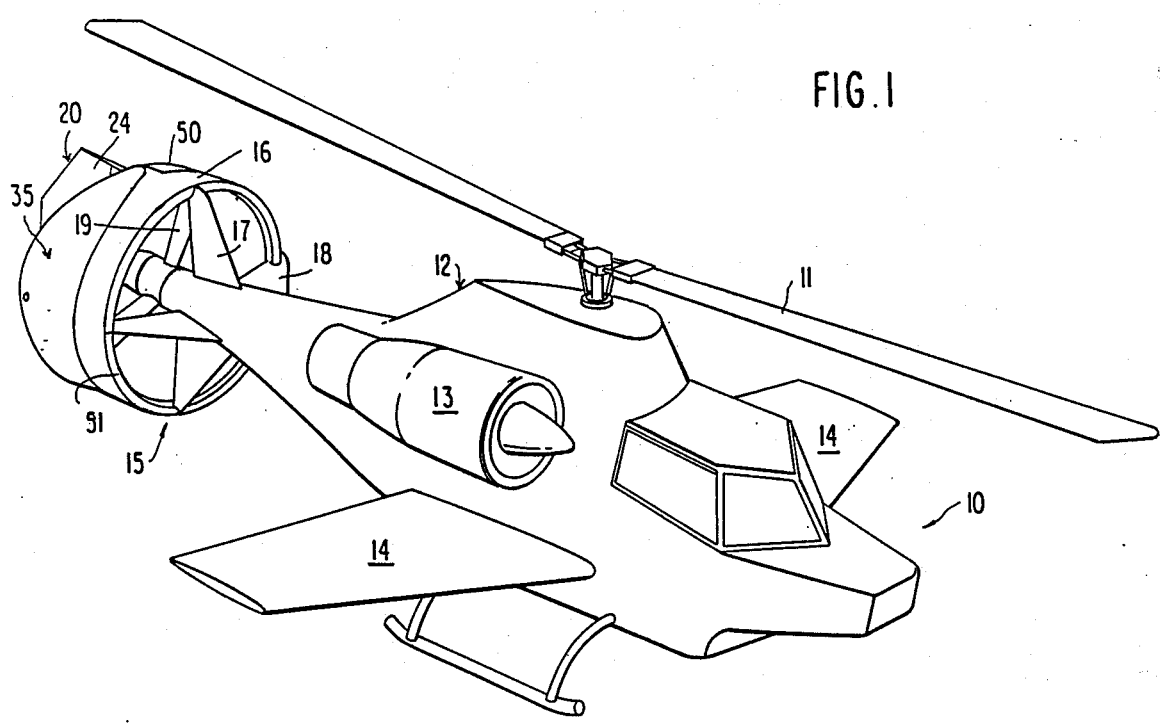
FIG. 1 is a perspective view of a helicopter having the improved tail assembly and controls contemplated by the present invention.

FIG. 1 illustrates a compound rotary wing aircraft of type described in the previously noted U.S. patents in which a single rotor 11 mounted on the fuselage 12 powered by an engine 13, fixed wings 14 extending from both sides of the fuselage provide lift in high speed forward flight with the rotor 11 in an unloaded condition. The rotor 11 provides lift for the aircraft in a slow speed and hover condition. The tail section 15 of the ring tail structure comprises an annular duct 16 supported by vertical and horizontal stabilizers 17, 18 with a variable pitch propeller 19 driven by the engine 13 contained within the interior of the duct 16. A multi-section, vertically extending rudder vane assembly 20 is mounted for rotation about a vertical axis within the interior of the duct 16 rearwardly of the propeller 19 and the aftermost portion extends rearwardly of the duct in the forward high speed flight condition of the aircraft as illustrated in FIG. 1.

Figure 11:
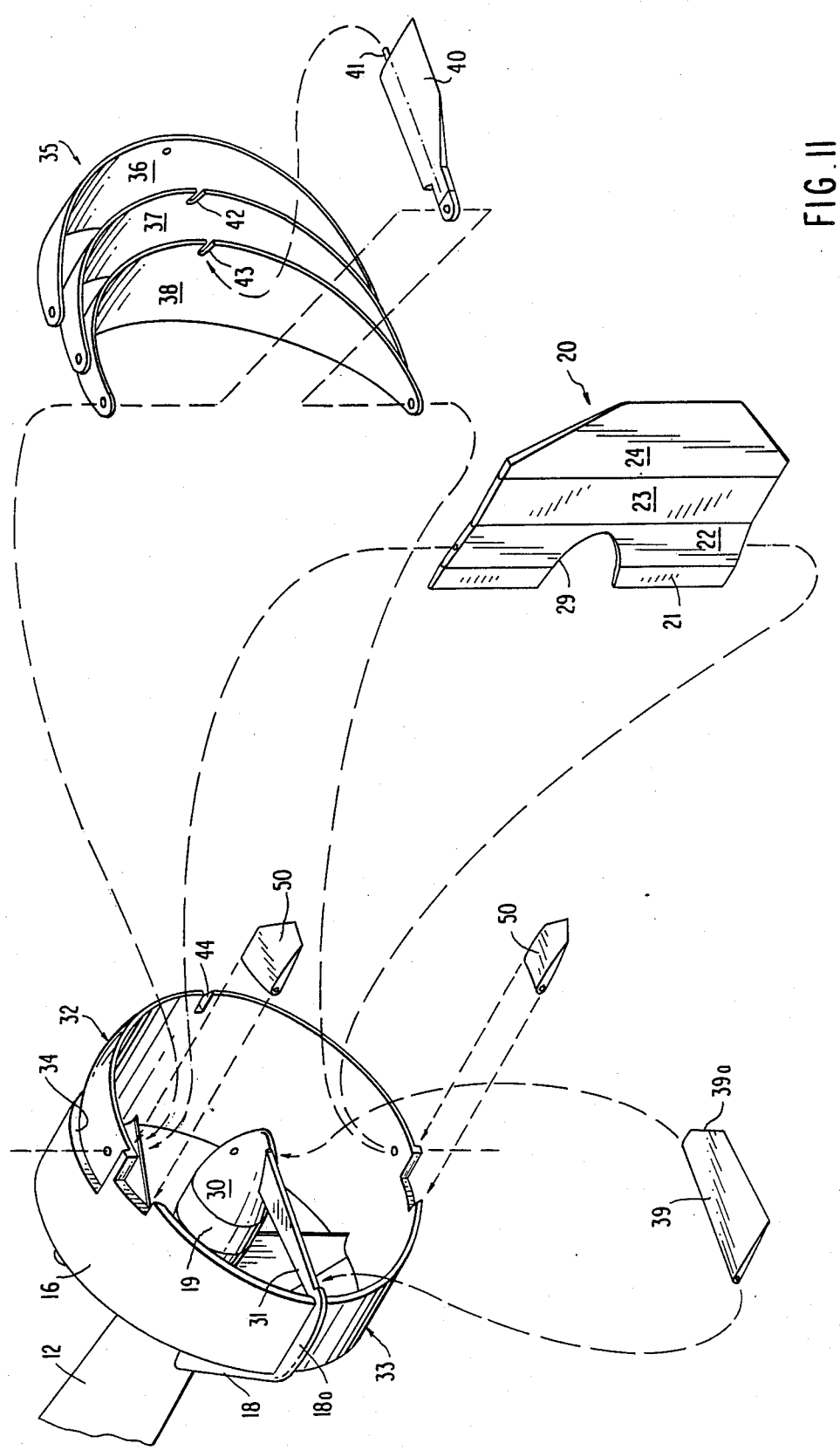
FIG. 11 is an exploded perspective view of the major components of the tail assembly.

As best seen in FIGS. 3, 4, 8 and 9, the rudder vane assembly 20 comprises multiple vane sections 21, 22, 23, 24 interconnected in a tandem arrangement by pivotal connections 25, 26, 27, the main rudder section 22 being supported for rotation about the vertically extending axis on the torque tube 28 pivotally supported at both ends by portions of the upper and lower wall structure of the duct 16. Linkages between adjoining vane sections (not illustrated) equivalent or similar to the directional - controlling vanes of U.S. Pat. No. 3,260,432 cause the individual rudder vane sections to rotate angularly relative to one another about their pivotal connections changing the camber of the rudder vane assembly surface when the main rudder vane section 22 is rotated about its torque tube axis 28 on either side of the rudder vane neutral position shown in FIG. 3 in which all vane sections are aligned along the aircraft longitudinal axis. In the full deflected position of maximum camber illustrated in FIGS. 7, 8 and 9 the rudder vane assembly 20 extends transversely of the interior of the duct 16 forwardly of and conforming generally to the arcuate shape of an extension 35 of the duct to be subsequently described. The middle portions of the rudder vane nose and main sections 21, 22 are cut away along line 29 (FIG. 11) to clear the propeller hub fairing 30 which is supported by a rear horizontal stabilizer member 31 that extends into the interior of the duct 16 rearwardly of the propeller 19 from the rearmost portion 18a of the horizontal stabilizer 18.

Figure 7:
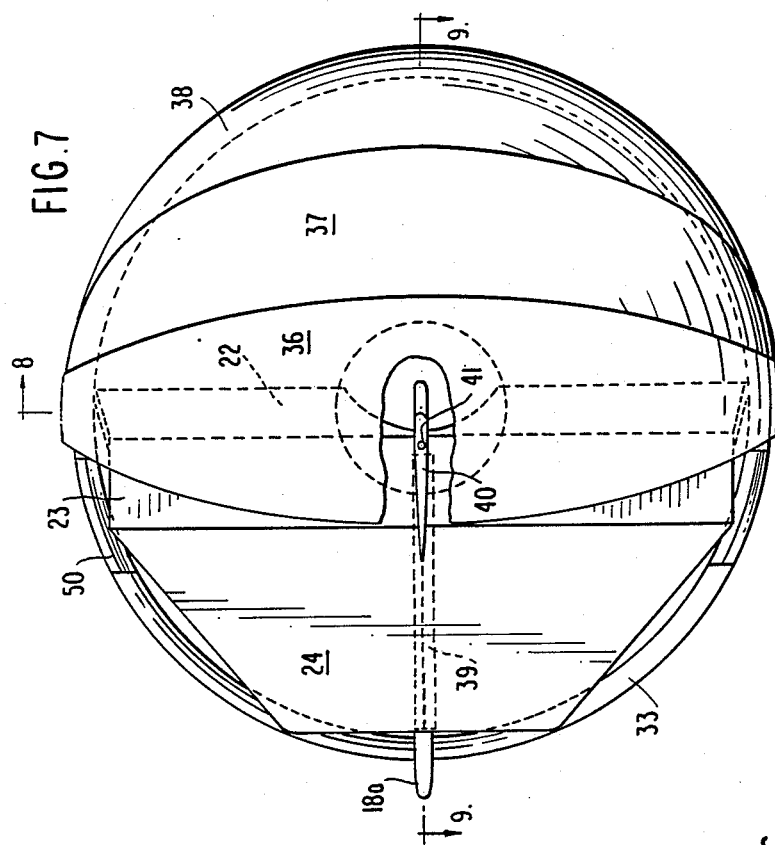
FIG. 7 is a rear elevation of the tail assembly of the aircraft in a hovering flight condition.
Figure 6:
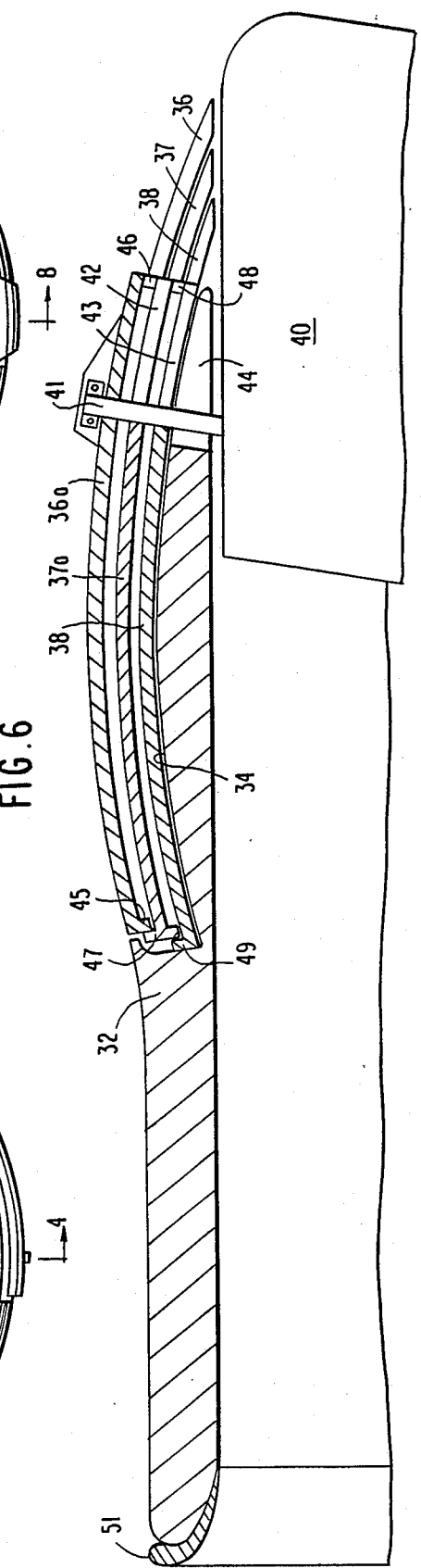
FIG. 6 is an enlarged section of the topmost portion of FIG. 3 showing the multi-segment duct extension elbow of the invention in the retracted position.
Figure 2:
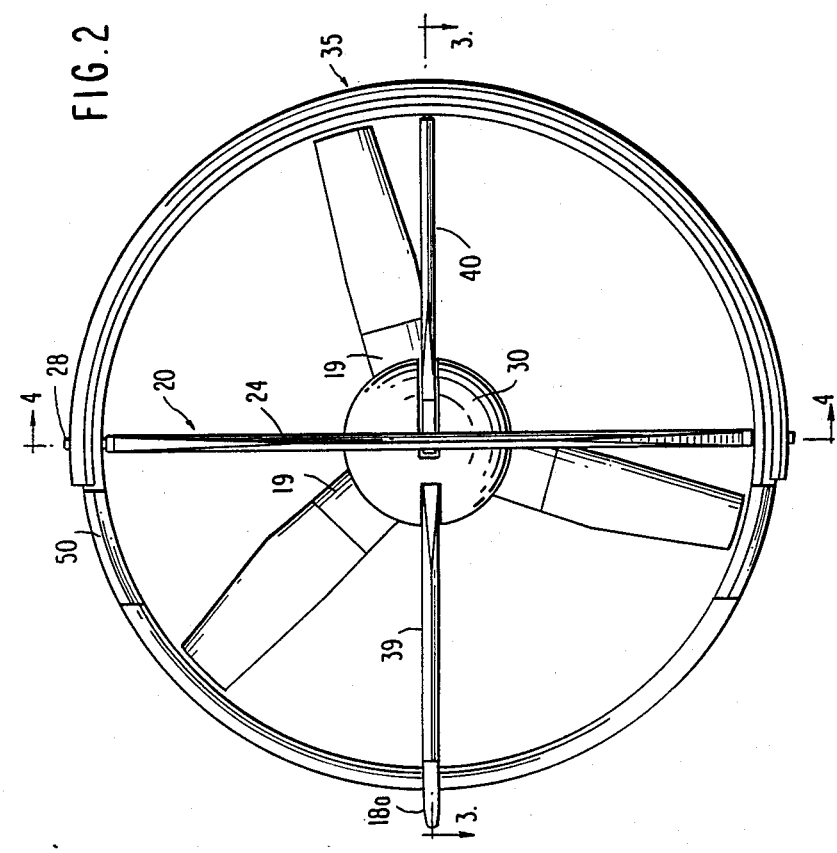
FIG. 2 is a rear elevation of the tail assembly of the aircraft of FIG. 1 in a forward high speed flight condition.
Figure 8:
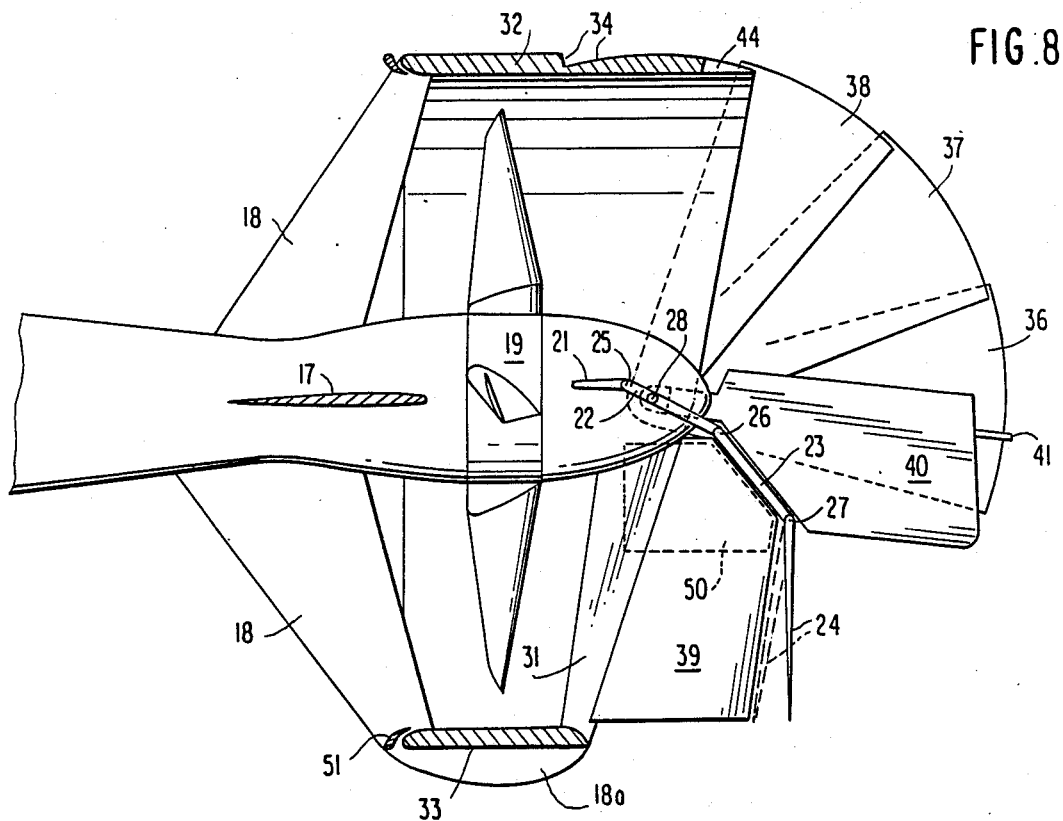
FIG. 8 is a vertical cross section along section line 8—8 of FIG. 7.
Figure 9:
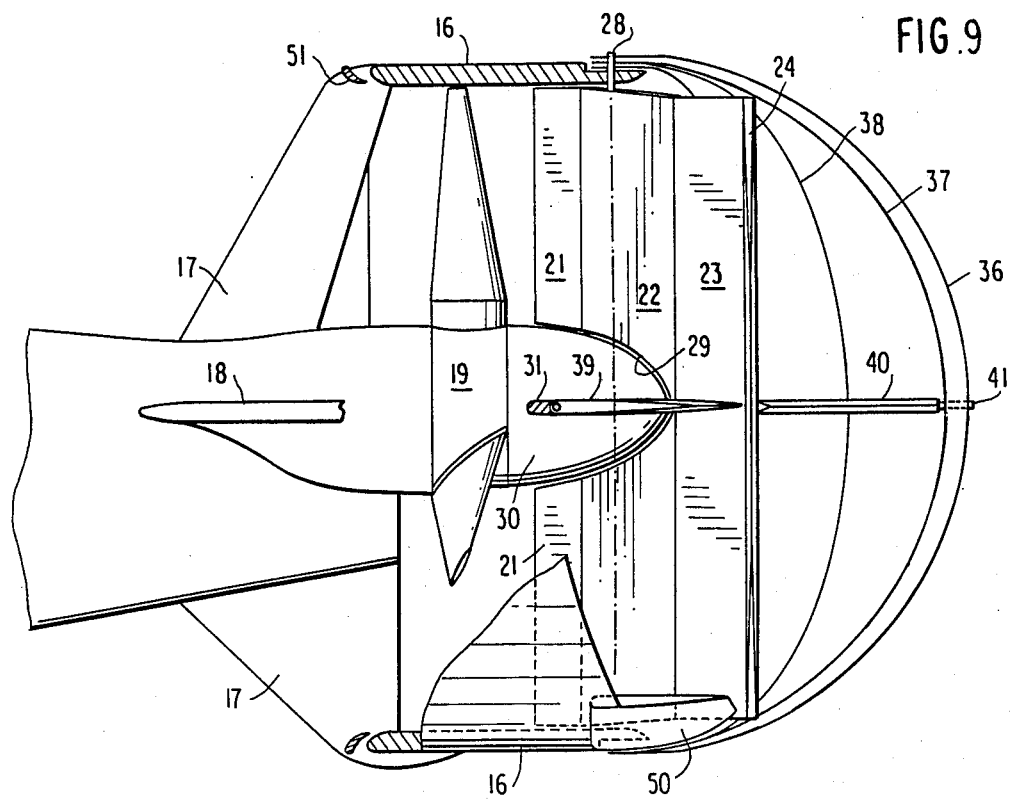
FIG. 9 is a horizontal cross section along section line 9—9 of FIG. 7.
Figure 10:
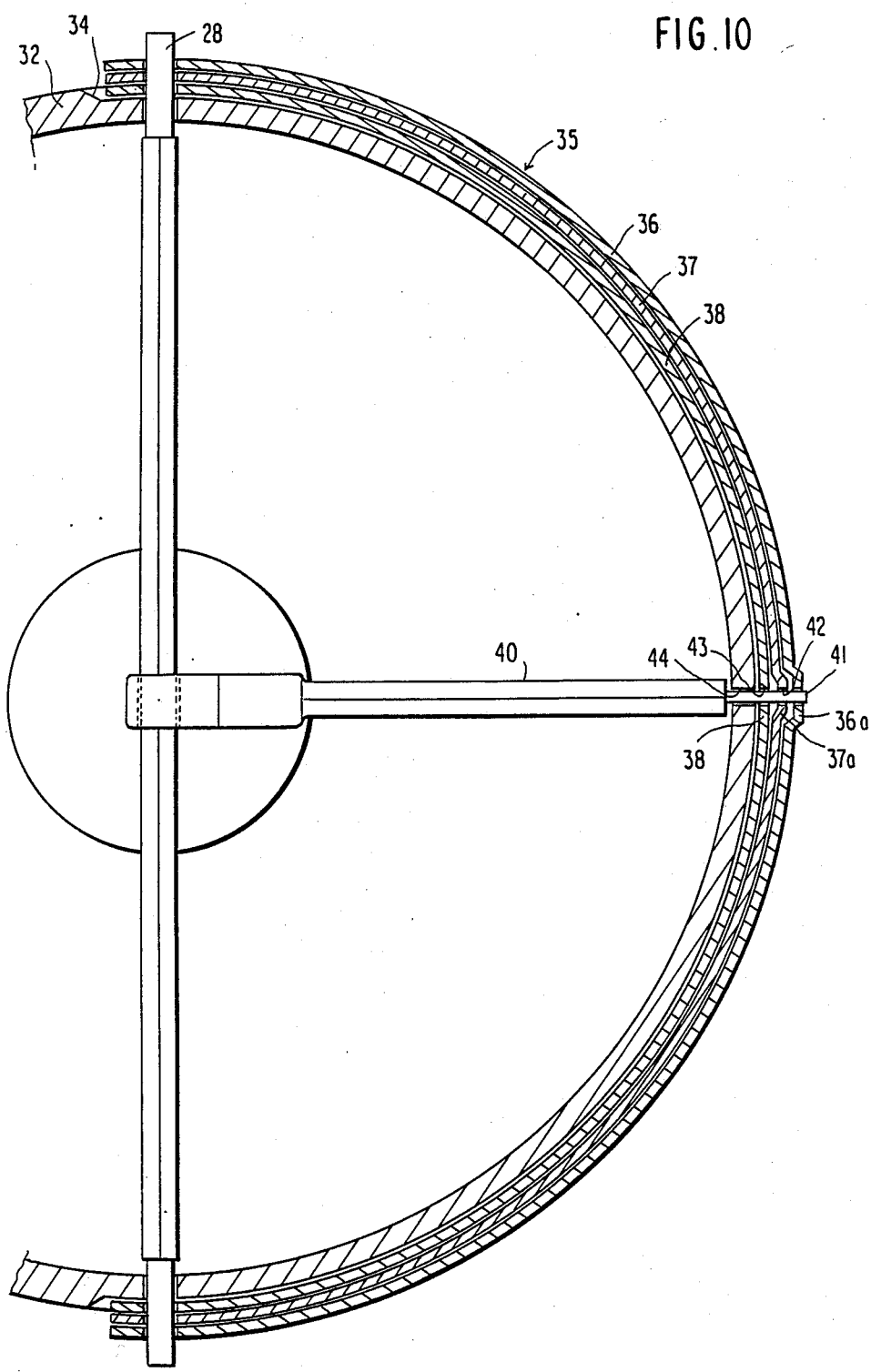
FIG. 10 is a partial vertical cross section taken along section line 11—11 of FIG. 3.

One lateral side 32 of the duct 16 is longer than the other side 33 to accommodate the propeller slip stream deflected by the improved ring tail configuration of the invention. The exterior of this longer side 32 of the duct has a recess 34 for accommodating the multi-segment extendable duct elbow assembly 35 which forms the outer wall of the longer lateral side 32 of the duct 16. In the illustrated and preferred embodiment, the elbow assembly 35 comprises three overlying arcuate segments, an outer segment 36, a middle segment 37 and an inner segment 38 which are pivotally supported at their upper and lower ends for rotation in a sliding relationship to one another about the vertically extending rudder vane torque tube 28 for movement between a retracted position in a mutually overlying, nesting relationship establishing the outer wall contour of the longer duct lateral side 32, as illustrated in FIGS. 3, 4 and 6, and an extended position in a partially overlapping and adjoining relationship establishing a continuous arcuate extension of the annular duct 16 that extends rearwardly of the annular duct wall, obliquely of the duct interior and transversely of the duct longitudinal axis as illustrated in FIGS. 7, 8 and 9. As best seen in FIG. 8, the combination of the multi-sector rudder vane 20 with its sections 21, 22, 23, 24 pivotally rotated relative to one another in the form of a arcuate deflecting vane inside of and forwardly of the arcuate, clam shell shaped, rearward extension of the duct 16 provided by the elbow segments 36, 37, 38 in the extended position establish a smooth arcuate channel through which the propeller slip stream is deflected with minimum turbulence and resistance through substantially 90 degrees.

As in the ring tail configuration of U.S. Pat. No. 3,260,482 and other "ring tail" patents, provision is made for an upwardly and downwardly pivoting elevator surface assembly extending horizontally across the interior of the duct 16 to establish pitching moments for the aircraft. In a preferred configuration of this invention, the elevator assembly comprises two elevator surfaces. One is a conventional half-elevator surface 39 pivotally supported for rotation about a fixed horizontal axis for up and down motion on the rear side of the horizontal stabilizer member 31 to extend across half of the duct interior from the propeller shroud to the shorter side 33 of the interior of the duct 16. The other is a horizontally movable elevator surface 40 supported at its inner end for rotation in a horizontal plane about the vertical axis of the rudder vane torque tube 28 for horizontal movement along with the segments of the elbow assembly 35 when pivoting between the retracted and extended positions. Alternatively, the vertical rotational axis of the movable elevator 40 could be other than that of the rudder torque tube 28. A pin 41 at the outer end of the movable elevator surface 40 is pivotally contained in a raised portion 36a of the outer elbow segment and extends through slots 42, 43 in the trailing edges of the middle and inner elbow segments 37, 38 and slot 44 in the trailing edge of the duct recessed portion 34. The inner end portion of the movable elevator surface 40 is pivotally supported for up and down rotation of the elevator surface 40 about a horizontal axis along the line of the pin 41. Referring to FIG. 6, the forward end of the outer elbow segment 36 has an inwardly extending finger 45, the rear end of the middle elbow segment 37 has an outwardly extending finger 46 and the forward end a T-shaped finger 47, and the rear end of the inner elbow segment 38 has an outwardly extending finger 48 and the forward end an outwardly extending finger 49. As can be readily ascertained from FIG. 6, rotation of the outer elbow segment 36 from its retracted position with accompanying rearward sliding motion establishes consecutive contact of the fingers 45, 46, 47 and 48 that carries all elbow segments from the retracted to the extended positions. The consecutive contact of the fingers 45, 47 and 49 causes the elbow segments to rotate and slide forwardly from the extended to the retracted position upon forward movement of the outer elbow segment 36. Trim tabs 50 may be provided at the top and bottom rear surfaces of the duct 16 to provide pitching forces additional to that provided by the two elevator surfaces 39, 40 but they do not form any part of this invention. Extendable slats 51 are mounted along the annular, streamline tapered leading edge of the duct 16 and supported by the duct as are the slats on the wing leading edge of a fixed wing aircraft. Extension of the slats at low airspeeds as in FIGS. 8 and 9 establishes a channel between the slat and duct establishing low turbulence air flow and improved aerodynamic efficiency of the air flow through the duct.

As explained in U.S. Pat. Nos. 3,309,937 and 3,138,349, the components of the "ring tail" structure of a rotary wing aircraft are preferably set and controlled to different degrees relative to one another upon operation of the pilot's controls when the aircraft is in a hover or slow speed flight condition and when in a high speed cruising flight condition. When in a hover condition the structural components of the ring tail are positioned as will establish deflection of the tail propeller slip stream to a maximum degree and movement of the pilot's rudder pedals controls the pitch of the tail propeller to the degree that the magnitude of the deflected propeller slip stream provides yaw control that is equal to, greater than, or less than that required to counteract the rotor torque, the positions of the rudder vane of the ring tail being essentially unaffected by rudder pedal movement. When in a high speed cruising flight condition with the rotor unloaded and aircraft lift being largely transferred to the fixed wings, the structural components of the "ring tail" are positioned such that little or no slip stream deflection is created in counteracting rotor torque, movement of the pilot's rudder pedals controlling only the position of the neutrally positioned rudder vane sufficiently to establish yaw control in forward flight and having no effect on the pitch of the tail propeller which provides thrust for propelling the aircraft in forward flight and is in a pitch range which can absorb up to the full power of the engine for high speed.

Figure 12:
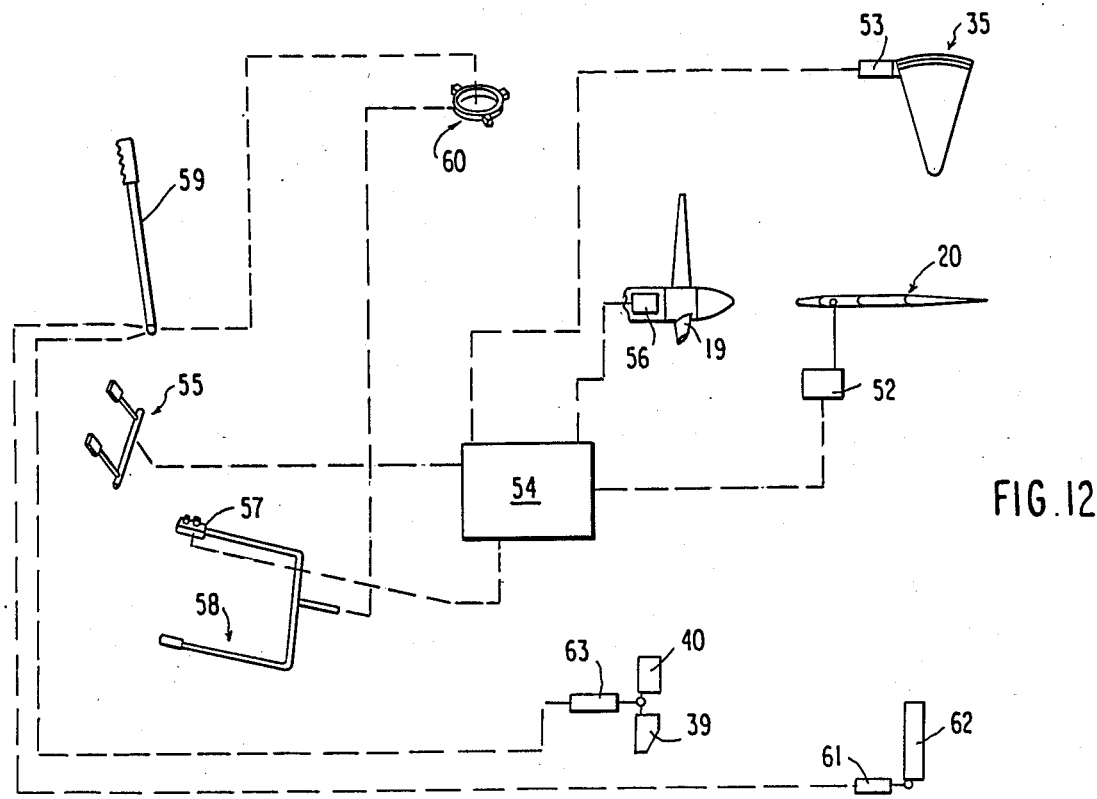
FIG. 12 is a schematic diagram of the aircraft flight control system.

Referring to FIG. 12, the aircraft pilot's controls are generally conventional in nature with the pilot's control stick 59 connected to a rotor pitch control mechanism 60, to an actuator or actuators 63 that operate elevators 39, 40 and an actuator 61 operating ailerons or flaperons 62, all of which provides pitch and roll control for the aircraft in the conventional manner. Pilot control establishing the degree of high or low pitch setting of the tail propeller that is appropriate for the flight condition of slow speed and hover or high speed cruise is established by the setting of the propeller pitch control "beeper" switch 57 normally mounted on the pilot's collective pitch control lever 58. For high speed cruising flight the pitch beeper switch 57 is set in the high pitch range so the tail propeller absorbs a large proportion of or full power of the engine to maintain high speed forward flight. For slow speed and hover flight the pitch beeper switch 57 is set in the low pitch range to provide the magnitude of necessary deflected slip stream thrust required to counterbalance rotor torque and provide yaw control of the aircraft at slow speeds.

Movement of the rudder and elevator control surfaces and the elbow segments requires forces normally exceeding pilot limitations and actuating forces for these moveable elements are conveniently provided by conventional hydraulic or electrical-mechanical actuators. Rudder vane actuator 52 connected to the rudder vane torque tube 28 of the rudder vane assembly 20 and elbow assembly actuator 53 connected to the outer elbow segment 36 are actuated by connections from a primary control mixing unit 54 which, in turn, has connections to the pilot's rudder pedals 55, the tail propeller pitch actuator 56 and the flight condition establishing propeller pitch beeper switch 57. The mixing unit 54 combines the input of rudder pedal movement signals generated by movement of the rudder pedals 55 with the input of the high or low setting signal received from the setting of the flight condition establishing propeller pitch beeper switch 57 to generate signals to the propeller pitch actuator 56, the rudder vane actuator 52 and the elbow assembly actuator 53 as will establish the pitch of the propeller 19 and the positions of the rudder vane assembly 20 and the segmented elbow assembly 35 that create the degree of propeller slip stream velocity and deflection as is required to counteract rotor torque and maintain the desired azimuth direction of the aircraft for the flight condition setting of the propeller pitch beeper switch 57. A low pitch setting of the propeller beeper switch 57 for hover and low speed flight generates signals in the mixing unit 54 that deploy the segmented elbow assembly 35 to the fully extended position and the rudder vane assembly 20 to the fully deflected position illustrated in FIGS. 7, 8, and 9, movement of the rudder pedals 55 generating signals in the mixing unit that sets the tail propeller to the pitch which provides the required degree of deflected slip stream thrust to counteract rotor torque and provide yaw control. To proceed into a high speed cruising flight condition the propeller beeper switch 57 is actuated to increase the propeller pitch into a high range wherein the mixing unit 54 generates signals causing the segmented elbow assembly to retract from the extended position, the rudder vane assembly 20 to move toward the neutral position and, at the same time, gradually removes the effect of the rudder pedal movement on propeller pitch and transfers the effect of rudder pedal movement to controlling the position of the rudder vane assembly 20 with respect to the neutral position for providing yaw control. The design of the primary direction control mixing unit 54 forms no part of the present invention and can be a mechanical linkage of the nature similar to that disclosed in U.S. Pat. No. 3,309,937 for coordinating the control of multiple mechanisms or, alternatively, could be in a nature of a computer programmed in a manner known to those of normal skill in the art that would create correct signals to the actuators for the rudder vane, the segmented elbow assemblies and the pitch control of the propeller.

It should be understood that the foregoing disclosure involves a typical embodiment of the invention and that numerous modifications or alterations may be made therein without departing from the spirit and scope of the invention as set forth in the appendant claims.

What is claimed is:

1. In a single rotor rotary wing aircraft having a tail assembly comprising an annular duct having leading and trailing edges and a wall within the interior of which a variable pitch propeller is concentrically mounted for rotation forwardly of means for deflecting the propeller slip stream transversely of the duct longitudinal axis, the improvement wherein said deflecting means comprises in combination: one lateral side of said duct including a plurality of arcuate elbow segments each having a length-wise dimension partially that of the duct circumference, means pivotally supporting upper and lower portions of each said elbow segment for rotation of each segment about a vertical axis between a retracted position in which said segments are in a nesting, mutually overlying relationship coincident with said duct one lateral side and an extended position in which said segments are in a mutually adjoining, edge overlapping relationship to extend obliquely transversely of the duct longitudinal axis rearwardly of said duct trailing edge as a continuous, rearwardly projecting and transversely extending arcuate extension of said duct one lateral side, means for rotating said elbow segments between said retracted and extended positions, a multiple section rudder vane assembly of tandemly arranged sections extending vertically of the interior of said duct rearwardly of said propeller and pivotally supported for rotation about a vertical axis between a neutral position in which the respective multiple sections of said rudder assembly are in alignment with the longitudinal axis of said duct and a deflected position in which said multiple sections are angularly disposed relative to each other extending transversely of said duct interior and longitudinal axis, said rudder vane assembly comprising a plurality of vane sections, means pivotally connecting each said section to an adjoining section for rotation relative to each other about respective vertical pivotal axes, means supporting a main one of said sections from said duct for rotation about the rudder vane assembly vertical axis, means interconnecting said sections establishing relative angular rotational motion between adjoining sections about the respective section pivotal axes upon said main vane section rotating about said rudder vane assembly vertical axis, and means associated with said elbow segment rotating means for rotating said main rudder vane section between said neutral rudder vane position and a fully deflected rudder vane position with said multiple sections in a tandem, arcuate arrangement extending transversely of said duct interior oppositely said duct one lateral side.

2. The improvement of claim 1 additionally comprising an elevator surface having a longitudinal axis extending between inner and outer end portions of said surface, means pivotally supporting said elevator surface for rotation of said surface about its longitudinal axis with said surface extending horizontally interiorly of the duct between said elbow segment rotational axis and the innermost one of said elbow segments, said outer elevator surface end portion including means for establishing retaining contact with an elbow segment, and pivotal means connected to said surface inner end portion for rotation of said elevator surface in a horizontal plane about said elbow segment rotational axis.

3. The improvement of claim 1 wherein the aircraft has flight control means that include yaw control means, propeller pitch control means and flight condition control means having a range of settings between a hovering and a forward high speed cruising flight condition, said improvement additionally comprising primary direction control mixing means operably connected to the yaw control means, the tail propeller pitch control means, the flight condition control means and said elbow segment and main rudder vane section rotating means, said primary directional control mixing means comprising means actuating said elbow segment and main rudder vane section rotating means for moving said elbow segments and said rudder vane sections to varying positions and for interconnecting the yaw control and propeller pitch control means for varying the amount of change in propeller pitch produced by movement of the yaw control means dependent upon the flight condition control means setting with respect to the hovering and the high speed cruising flight conditions.

4. The improvement of claim 1 wherein the aircraft has flight controls that include azimuth directional control, means for controlling the pitch of said tail propeller and flight condition control means having a range of settings between a hovering and a forward high speed cruising flight condition, said improvement additionally comprising primary directional control mixing means operably connected to said flight controls and to said elbow segment and main rudder vane section rotating means, said mixing means including means: (1) actuating said elbow segment and main rudder vane section rotating means for rotating said elbow segments toward said extended position and said main rudder vane section toward said fully deflected rudder vane position and for actuating said propeller pitch control means in changing propeller pitch upon actuation of said azimuth directional control means when said flight condition control means is set in the hovering range and (2) actuating said elbow segment and main rudder vane section rotating means for rotating said elbow segments toward said retracted position and said main rudder vane section toward said neutral rudder vane position and for nonactuation of said propeller pitch control means in changing propeller pitch upon actuation of said azimuth directional control means when said flight condition control means is set in the high speed cruising flight condition.

5. A slip stream deflector tail assembly for rotary wing aircraft comprising an annular duct having leading and trailing edges and an interior wall concentrically within which a propeller is mounted for rotation, one lateral side of said duct including a plurality of arcuate elbow segments each extending partially circumferentially of said duct, means pivotally supporting upper and lower portions of each said elbow segment for rotation of said elbow segments about a vertical axis between a retracted position in which said elbow segments are in a mutually overlying relationship coincident with said duct one lateral side and an extended position in which said elbow segments are in a mutually adjoining, edge overlapping relationship to extend obliquely transversely of the duct longitudinal axis rearwardly of said duct trailing edge as a continuous, transversely projecting, arcuate extension of said duct one lateral side, and means for rotating said elbow segments between said retracted and extended positions, the interior wall of said duct one lateral side being unbroken and the exterior wall of said duct one lateral side having a recess extending forwardly of said duct trailing edge, said recess being configured to accommodate said position with the outermost of said elbow segments constituting an exterior wall portion of said duct.

6. The tail assembly of claim 5 wherein said segment rotational axis and the longitudinally extending central axis of said duct intersect, each of said elbow segments having a span such that said duct longitudinal central axis intersects the furthermost extended ones of said elbow segments when said segments are in said extended position.

7. A slip stream deflector tail assembly for rotary wing aircraft comprising an annular duct having leading and trailing edges and an interior wall concentrically within which a propeller is mounted for rotation, one lateral side of said duct including a plurality of arcuate elbow segments each extending partially circumferentially of said duct, means pivotally supporting upper and lower portions of each said elbow segment for rotation of said elbow segments about a vertical axis between a retracted position in which said elbow segments are in a mutually overlying relationship coincident with said duct one lateral side and an extended position in which said elbow segments are in a mutually adjoining, edge overlapping relationship to extend obliquely transversely of the duct longitudinal axis rearwardly of said duct trailing edge as a continuous, transversely projecting, arcuate extension of said duct one lateral side, means for rotating said elbow segments between said retracted and extended positions, a horizontally oriented elevator surface having inner and outer ends and a span that extends between said segment rotational axis and the innermost of said elbow segments, means connecting said elevator surface outer end to one of said elbow segments, and means pivotally supporting said elevator surface inner end from said duct for rotation of said elevator surface in the horizontal plane about said segment rotational axis.

8. The tail assembly of claim 7 additionally comprising a multiple section rudder vane assembly of tandemly arranged sections extending vertically of the interior of said duct rearwardly of said propeller and pivotally supported for rotation about a vertical axis between a neutral position in which the respective multiple sections of said rudder assembly are in alignment with the longitudinal axis of said duct and a deflected position in which said multiple sections are angularly disposed relative to each other extending transversely of said duct interior and longitudinal axis, said rudder vane assembly comprising a plurality of vane sections, means pivotally connecting each said section to an adjoining section for rotation relative to each other about respective vertical pivotal axes, means supporting a main one of said sections from said duct for rotation about the rudder vane assembly vertical axis, means interconnecting said sections establishing relative angular rotational motion between adjoining sections about the respective section pivotal axes upon said main vane section rotating about said rudder vane assembly vertical axis, and means associated with said elbow segment rotating means for rotating said main rudder vane section between said neutral rudder vane position and a fully deflected rudder vane position with said multiple sections in a tandem, arcuate arrangement extending transversely of said duct interior oppositely said duct one lateral side.

9. A slip stream deflector tail assembly for rotary wing aircraft comprising an annular duct having leading and trailing edges and an interior wall concentrically within which a propeller is mounted for rotation, one lateral side of said duct including a plurality of arcuate elbow segments each extending partially circumferentially of said duct, means pivotally supporting upper and lower portions of each said elbow segment for rotation of said elbow segments about a vertical axis between a retracted position in which said elbow segments are in a mutually overlying relationship coincident with said duct one lateral side and an extended position in which said elbow segments are in a mutually adjoining, edge overlapping relationship to extend obliquely transversely of the duct longitudinal axis rearwardly of said duct trailing edge as a continuous, transversely projecting, arcuate extension of said duct one lateral side, means for rotating said elbow segments between said retracted and extended positions, a multiple section rudder vane assembly of tandemly arranged sections extending vertically of the interior of said duct rearwardly of said propeller and pivotally supported for rotation about a vertical axis between a neutral position in which the respective multiple sections of said rudder assembly are in alignment with the longitudinal axis of said duct and a deflected position in which said multiple sections are angularly disposed relative to each other extending transversely of said duct interior and longitudinal axis, said rudder vane assembly comprising a plurality of vane sections means pivotally connecting each said section to an ajoining section for rotation relative to each other about respective vertical pivotal axes, means supporting a main one of said sections from said duct for rotation about the rudder vane assembly vertical axis, means interconnecting said sections establishing relative angular rotational motion between adjoining sections about the respective section pivotal axes upon said main vane section rotating about said rudder vane assembly vertical axis, and means associated with said elbow segment rotating means for rotating said main rudder vane section between said neutral rudder vane position and a fully deflected rudder vane position with said multiple sections in a tandem, arcuate arrangement extending transversely of said duct interior oppositely said duct one lateral side.

10. In a rotary wing aircraft having a tail assembly comprising an annular duct having leading and trailing edges and a wall within the interior of which a variable pitch propeller is concentrically mounted for rotation forwardly of means for deflecting the propeller slip stream transversely of the duct longitudinal axis, the improvement wherein a portion of the wall of one lateral side of the duct comprises a plurality of overlying elbow segments of arcuate shape each extending partially circumferentially of the duct, support means pivotally supporting upper and lower portions of each said elbow segment for rotation of each said elbow segment about a vertical axis between a retracted position in which said segments are in a mutually overlying relationship coincident with said duct one lateral side and an extended position in which said segments are in a mutually adjoining, edge overlapping relationship extending obliquely transversely of the duct longitudinal axis rearwardly of said duct trailing edge as a continuous, rearwardly projecting and transversely extending arcuate extension of said duct one lateral side, and said deflecting means includes means for rotating said elbow segments between said retracted and extended positions, the interior wall of said duct one lateral side having a recess extending forwardly of said duct trailing edge, said recess being configured to accommodate said mutually overlying plurality of elbow segments in said retracted position with the outermost of said elbow segments constituting an exterior wall surface of said duct.

11. The improvement of claim 10 wherein said segment pivotal vertical axis and the central longitudinal axis of the duct intersect and the span of each of said segments is such that the furthermost extended ones of said segments in said extended position is in the line of said shrouded duct longitudinal axis.

12. In a rotary wing aircraft having a tail assembly comprising an annular duct having leading and trailing edges and a wall within the interior of which a variable pitch propeller is concentrically mounted for rotation forwardly of means for deflecting the propeller slip stream transversely of the duct longitudinal axis, the improvement wherein a portion of the wall of one lateral side of the duct comprises a plurality of overlying elbow segments of arcuate shape each extending partially circumferentially of the duct, support means pivotally supporting upper and lower portions of each said elbow segment for rotation of each said elbow segment about a vertical axis between a retracted position in which said segments are in a mutually overlying relationship coincident with said duct one lateral side and an extended position in which said segments are in a mutually adjoining, edge overlapping relationship extending obliquely transversely of the duct longitudinal axis rearwardly of said duct trailing edge as a continuous, rearwardly projecting and transversely extending arcuate extension of said duct one lateral side, said deflecting means includes means for rotating said elbow segments between said retracted and extended positions, and an additional improvement comprising an elevator surface having a longitudinal axis extending between inner and outer end portions of said surface, is pivotally supported for rotation about its longitudinal axis with said elevator surface extending horizontally interiorly of the duct between said elbow segment rotational axis and the innermost one of said elbow segments, said outer elevator surface end portion including means for establishing retaining contact with an elbow segment, and said elevator surface inner end portion connects to pivotal means for rotation of said elevator surface in a horizontal plane about said elbow segment rotational axis.

13. In a rotary wing aircraft having a tail assembly comprising an annular duct having leading and trailing edges and a wall within the interior of which a variable pitch propeller is concentrically mounted for rotation forwardly of means for deflecting the propeller slip stream transversely of the duct longitudinal axis, the improvement wherein a portion of the wall of one lateral side of the duct comprises a plurality of overlying elbow segments of arcuate shape each extending partially circumferentially of the duct, support means pivotally supporting upper and lower portions of each said elbow segment for rotation of each said elbow segment about a vertical axis between a retracted position in which said segments are in a mutually overlying relationship coincident with said duct one lateral side and an extended position in which said segments are in a mutually adjoining, edge overlapping relationship extending obliquely transversely of the duct longitudinal axis rearwardly of said duct trailing edge as a continuous, rearwardly projecting and transversely extending arcuate extension of said duct one lateral side, and said deflecting means includes means for rotating said elbow segments between said retracted and extended positions, said aircraft having flight controls that include yaw control means, tail propeller pitch control means and flight condition control means having a range of settings between a hovering condition and a forward high speed cruising flight condition and a primary directional control mixing means operably connected to said aircraft flight controls and said elbow segment rotating means, said primary directional control mixing means comprising means actuating said elbow segment rotating means for moving said elbow segments to varying positions and interconnecting the yaw control and propeller pitch control means for varying the amount of change in propeller pitch produced by movement of the yaw control means dependent upon the flight condition control means setting with respect to the hovering and the cruising high speed flight conditions.

14. In a rotary wing aircraft having a tail assembly comprising an annular duct having a leading and trailing edges and a wall within the interior of which a variable pitch propeller is concentrically mounted for rotation forwardly of means for deflecting the propeller slip stream transversely of the duct longitudinal axis, the improvement wherein a portion of the wall of one lateral side of the duct comprises a plurality of overlying elbow segments of arcuate shape each extending partially circumferentially of the duct, support means pivotally supporting upper and lower portions of each said elbow segment for rotation of each said elbow segment about a vertical axis between a retracted position in which said segments are in a mutually overlying relationship coincident with said duct one lateral side and an extended position in which said segments are in a mutually adjoining, edge overlapping relationship extending obliquely transversely of the duct longitudinal axis rearwardly of said duct trailing edge as a continuous, rearwardly projecting and transversely extending arcuate extension of said duct one lateral side, and said deflecting means includes means for rotating said elbow segments between said retracted and extended positions, a multiple section rudder vane assembly of tandemly arranged sections extending vertically of the interior of said duct rearwardly of said propeller and pivotally supported for rotation about a vertical axis between a neutral position in which the respective multiple sections of said rudder assembly are in alignment with the longitudinal axis of said duct and a deflected position in which said multiple sections are angularly disposed relative to each other extending transversely of said duct interior and longitudinal axis, said rudder vane assembly comprising a plurality of vane sections, means pivotally connecting each said section to an adjoining section for rotation relative to each other about respective vertical pivotal axes, means supporting a main one of said sections from said duct for rotation about the rudder vane assembly vertical axis, means interconnecting said sections establishing relative angular rotational motion between adjoining sections about the respective section pivotal axes upon said main vane section rotating about said rudder vane assembly vertical axis, and means associated with said elbow segment rotating means for rotating said main rudder vane section between said neutral rudder vane position and a fully deflected rudder vane position with said multiple sections in a tandem, arcuate arrangement extending transversely of said duct interior oppositely of said duct one lateral side.

15. The improvement of claim 14 wherein the aircraft has flight control means that include yaw control means, propeller pitch control means and flight condition control means having a range of settings between a hovering condition and a forward high speed cruising flight condition, said improvement additionally comprising primary direction control mixing means operably connected to the yaw control means, the tail propeller pitch control means, the flight condition control means and said elbow segment and main rudder vane section rotating means, said primary directional control mixing means comprising means for actuating said elbow segment and main rudder vane section rotating means in moving said elbow segments and said rudder vane sections to varying positions and for interconnecting the yaw control and propeller pitch control means for varying the amount of change in propeller pitch produced by movement of the yaw control means dependent upon the flight condition control means setting with respect to the hovering and the high speed cruising flight conditions.

16. In a rotary wing aircraft having a tail assembly comprising an annular duct having leading and trailing edges and a wall within the interior of which a variable pitch propeller is concentrically mounted for rotation forwardly of means for deflecting the propeller slip stream transversely of the duct longitudinal axis, the improvement wherein a portion of the wall of one lateral side of the duct comprises a plurality of overlying elbow segments of arcuate shape each extending partially circumferentially of the duct, support means pivotally supporting upper and lower portions of each said elbow segment for rotation of each said elbow segment about a vertical axis between a retracted position in which said segments are in a mutually overlying relationship coincident with said duct one lateral side and an extended position in which said segments are in a mutually adjoining, edge overlapping relationship extending obliquely transversely of the duct longitudinal axis rearwardly of said duct trailing edge as a continuous, rearwardly projecting and transversely extending arcuate extension of said duct one lateral side, and said deflecting means includes means for rotating said elbow segments between said retracted and extended positions, said aircraft having flight controls that include means for aximuth directional control, means for controlling the pitch of said tail propeller and flight condition control means having a range of settings between a hovering and a forward high speed cruising flight condition and a primary directional control mixing means connected to said flight controls and to said means for rotating said elbow segments, said mixing means including means: (1) actuating said elbow segment rotating means for rotating said elbow segments toward said extended position and for actuating said propeller pitch control means in changing propeller pitch upon actuation of said azimuth control means when said flight condition control means is set in the hovering condition range and (2) actuating said elbow segment rotating means for rotating said elbow segments toward said retracted position and for establishing non-actuation of said propeller pitch control means in changing propeller pitch upon actuation of said azimuth direction control means when said flight condition control means is set in the high speed cruising condition range.

17. A slip stream deflector tail assembly for rotary wing aircraft comprising an annular duct having leading and trailing edges and an interior wall concentrically within which a propeller is mounted for rotation, one lateral side of said duct including a plurality of arcuate elbow segments each extending partially circumferentially of said duct, means pivotally supporting upper and lower portions of each said elbow segment for rotation of said elbow segments about a vertical axis between a retracted position in which said elbow segments are in a mutually overlying relationship coincident with said duct one lateral side and an extended position in which said elbow segments are in a mutually adjoining, edge overlapping relationship to extend obliquely transversely of the duct longitudinal axis rearwardly of said duct trailing edge as a continuous, transversely projecting, arcuate extension of said duct one lateral side, means for rotating said elbow segments between said retracted and extended positions, a rudder vane assembly supported within the interior of said duct rearwardly of said propeller to include a vertically extending rudder surface and means supporting said rudder surface for rotation about a vertical axis between a neutral position in which said rudder surface is in alignment with the longitudinal axis of said duct and a deflected position in which said rudder surface extends transversely of said duct longitudinal axis, means for rotating said rudder surface between said neutral and deflected positions, and means interconnecting said elbow segment and rudder surface rotating means actuating both said rotating means concurrently for establishing rotation of said rudder surface between said neutral position and a fully deflected position extending obliquely transversely of said duct interior spaced forwardly of and collaterally of the location of the elbow segments in said extended position concurrently with rotation of said elbow segments between said retracted and extended positions.

18. The tail assembly of claim 17 wherein the interior wall of said duct one lateral side is unbroken and the exterior wall of said duct one lateral side has a recess extending forwardly of said duct trailing edge, said recess being configured to accommodate said mutually overlying plurality of elbow segments in said retracted position with the outermost of said elbow segments constituting an exterior wall portion of said duct.

19. In a rotary wing aircraft having a tail assembly comprising an annular duct having leading and trailing edges and a wall within the interior of which a variable pitch propeller is concentrically mounted for rotation forwardly of means for deflecting the propeller slip stream transversely of the duct longitudinal axis, the improvement wherein a portion of the wall of one lateral side of the duct comprises a plurality of overlying elbow segments of arcuate shape each extending partially circumferentially of the duct, support means pivotally supporting upper and lower portions of each said elbow segment for rotation of each said elbow segment about a vertical axis between a retracted position in which said segments are in a mutually overlying relationship coincident with said duct one lateral side and an extended position in which said segments are in a mutually adjoining, edge overlapping relationship extending obliquely transversely of the duct longitudinal axis rearwardly of said duct trailing edge as a continuous, rearwardly projecting and transversely extending arcuate extension of said duct one lateral side, and said deflecting means includes means for rotating said elbow segments between said retracted and extended positions, a rudder vane assembly supported within the interior of said duct rearwardly of said propeller to include a vertically extending rudder surface and means supporting said rudder surface for rotation about a vertical axis between a neutral position in which said rudder surface is in alignment with the longitudinal axis of said duct and a deflected position in which said rudder surface extends transversely of said duct longitudinal axis, means for rotating said rudder surface between said neutral and deflected positions, and means interconnecting said elbow segment and rudder surface rotating means for actuating both said rotating means concurrently for establishing rotation of said rudder surface between said neutral position and a fully deflected position extending obliquely transversely of said duct interior spaced forwardly of and collaterally of the location of the elbow segments in said extended position concurrently with rotation of said elbow segments between said retracted and extended positions.

20. The improvement of claim 29 wherein the aircraft has flight control means that include yaw control means, propeller pitch control means and flight condition control means having a range of settings between a hovering and a forward high speed cruising flight condition, and a primary direction control mixing means operably connected to said flight control means and to said elbow segment and rudder surface rotating means, said primary directional control mixing means comprising means actuating said elbow segment and rudder surface rotating means for moving said elbow segments and said rudder surface to varying positions and interconnecting the yaw control and propeller pitch control means for varying the amount of change in propeller pitch produced by movement of the yaw control means dependent upon the flight condition control means setting with respect to the hovering and the high speed cruising flight conditions.

* * * * *

UNITED STATES PATENT AND TRADEMARK OFFICE
CERTIFICATE OF CORRECTION

PATENT NO. : 4,905,932

DATED : March 6, 1990

INVENTOR(S) : Frank N. Piasecki

It is certified that error appears in the above-identified patent and that said Letters Patent is hereby corrected as shown below:

In claim 10, column 11, line 9 of the Patent, after "one lateral side" insert -- is unbroken and the exterior wall of said duct one lateral side --.

In claim 20, column 16, line 20 of the Patent, change "29" to -- 19 --.

Signed and Sealed this

Ninth Day of July, 1991

*Attest:*

HARRY F. MANBECK, JR.

*Attesting Officer*     *Commissioner of Patents and Trademarks*